US012666153B2

(12) United States Patent
Siwek et al.

(10) Patent No.: US 12,666,153 B2
(45) Date of Patent: Jun. 23, 2026

(54) IMAGE-ACQUIRING SYSTEM FOR PERFORMING BIOMETRIC RECOGNITION OF AN IRIS OF AN INDIVIDUAL

(71) Applicant: IDEMIA IDENTITY & SECURITY FRANCE, Courbevoie (FR)

(72) Inventors: Jean-François Siwek, Courbevoie (FR); Ngoc-Son-Dorian Nguyen, Courbevoie (FR); Jean-Michel Teyrol, Courbevoie (FR); Rahma Ait Bouhou, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 217 days.

(21) Appl. No.: 18/544,558

(22) Filed: Dec. 19, 2023

(65) Prior Publication Data
US 2024/0214687 A1 Jun. 27, 2024

(30) Foreign Application Priority Data
Dec. 23, 2022 (FR) ...................................... 22 14375

(51) Int. Cl.
*H04N 23/695* (2023.01)
*H04N 23/55* (2023.01)

(52) U.S. Cl.
CPC ........... *H04N 23/695* (2023.01); *H04N 23/55* (2023.01)

(58) Field of Classification Search
CPC ...... H04N 23/695; H04N 23/55; H04N 23/58; G03B 17/17; G03B 37/02; G06V 40/19; G02B 27/0093; G02B 26/0816
See application file for complete search history.

(56) References Cited

U.S. PATENT DOCUMENTS

| | | | | |
|---|---|---|---|---|
| 4,457,584 A | * | 7/1984 | Pryor | ..................... G02B 30/35 359/477 |
| 2003/0012413 A1 | | 1/2003 | Kusakari et al. | |
| 2007/0177288 A1 | * | 8/2007 | Foote | ................... G02B 26/105 359/872 |

(Continued)

FOREIGN PATENT DOCUMENTS

JP          2000-23946 A          1/2000

OTHER PUBLICATIONS

Preliminary French Search Report issued Aug. 7, 2023 in French Application 22 14375 filed on Dec. 23, 2022, 9 pages (with Written Opinion).

*Primary Examiner* — Christopher K Peterson
(74) *Attorney, Agent, or Firm* — Oblon, McClelland, Maier & Neustadt, L.L.P.

(57) ABSTRACT

An image-acquiring system, including a holder and a subsystem mounted on the holder, the subsystem including an image-acquiring device configured to acquire at least one image along an axis of sight, a reflective element arranged transversely to the axis of sight and configured to reflect the at least one image onto the image-acquiring device, the reflective element being mounted so as to be rotatable, about a first axis of rotation, with respect to the image-acquiring device, the first axis of rotation being orthogonal to the axis of sight of the image-acquiring device and wherein the subsystem is mounted to be rotatable with respect to the holder about a second axis of rotation, the second axis of rotation being parallel to the axis of sight of the image-acquiring device.

20 Claims, 6 Drawing Sheets

(56)  References Cited

U.S. PATENT DOCUMENTS

| 2008/0044063 | A1* | 2/2008 | Friedman | A61B 3/1216 |
| | | | | 382/117 |
| 2011/0285836 | A1 | 11/2011 | Friedman et al. | |
| 2013/0141560 | A1 | 6/2013 | Friedman et al. | |
| 2021/0183541 | A1* | 6/2021 | Mitchell | H01B 13/01209 |
| 2022/0130173 | A1 | 4/2022 | Inoue | |
| 2023/0062777 | A1* | 3/2023 | Herbig | G06V 40/19 |

* cited by examiner

IMAGE-ACQUIRING SYSTEM FOR PERFORMING BIOMETRIC RECOGNITION OF AN IRIS OF AN INDIVIDUAL

The invention relates to an image-acquiring system.

It more particularly relates to an image-acquiring system for performing biometric recognition, in particular biometric recognition of an iris of an individual, potentially a moving individual.

The invention is particularly applicable to technical fields such as security, in which it may be used to track and recognize information of an individual, in particular biometric information such as irises.

An image-acquiring system for tracking and performing biometric recognition of an iris of an individual, whether stationary or moving, typically comprises: a camera mounted parallel to a holder along an axis of sight of the camera; a first motor that is configured to orient the camera about an axis of rotation considered to be "vertical" and that allows the camera to make a horizontal rotational movement, which is referred to as a "panning" movement; and a second motor that is configured to orient the camera about an axis of rotation considered to be "horizontal" and that allows the camera to make a vertical rotational movement, which is also referred to as a "tilting" movement, thus orienting its inclination or tilt.

In this system, the two (panning and tilting) rotational movements of the camera with respect to the holder may be combined to obtain a capture field that is cone-with-a-rectangular-base shape.

However, at least one drawback of such an image-acquiring system is that it has a relatively large footprint in the plane of the holder, as a result of the arrangement of the camera parallel to the holder.

Another image-acquiring system for tracking and performing biometric recognition of an iris of an individual, whether stationary or moving, typically comprises: a fixedly mounted camera arranged perpendicular to a holder along the axis of sight of the camera; and a mirror positioned facing the camera and transverse to the axis of sight of the camera, the mirror being motorized about two axes of rotation with respect to the axis of sight of the camera, thus allowing the mirror to perform a horizontal rotational movement, referred to as "panning", and a vertical rotational movement, referred to as "tilting".

In such a system, the two rotational movements of the mirror may be combined to obtain a capture field that is cone-with-a-rectangular-base shape.

In such a system, the camera typically comprises an objective and a sensor, to which the objective transmits an image.

Such an image-acquiring system has the advantage of a relatively small footprint in the plane of the holder, compared with the image-acquiring system presented above.

Nevertheless, at least one drawback of such an image-acquiring system is that it has a limited capture field, in particular in comparison with the image-acquiring system presented above.

Specifically, the "panning" horizontal rotational movement of the mirror with respect to the axis of sight of the camera generates a rotation of the image reflected by the mirror with respect to the centre of the sensor of the camera.

The image reflected by the mirror then does not remain on the same horizontal line of the sensor of the camera.

Thus, the larger the angle of rotation during the panning movement of the mirror, the higher the risk of obtaining an image, in particular of the eyes and/or irises of an individual, that falls partially or completely beyond the sensor of the camera. This is particularly due to the fact that a camera sensor is typically of rectangular format and not circular, has standardized dimensions and is generally of limited footprint.

Consequently, such a rotation of the image reflected by the mirror onto the sensor during a panning movement limits the capture field of the camera.

In addition, the image perceived by the sensor is then distorted. The rotation of the reflected image on the sensor of the camera thus means that an additional step must be added to the image processing carried out by the image-acquiring system.

The present invention aims to mitigate at least some of these drawbacks, and potentially leads to other advantages.

To this end, according to a first aspect, an image-acquiring system is provided that comprises a holder and a subsystem mounted on the holder, said subsystem comprising an image-acquiring device configured to acquire at least one image along an axis of sight, a reflective element arranged transversely to said axis of sight and configured to reflect the at least one image onto said image-acquiring device, said reflective element being mounted so as to be rotatable, about a first axis of rotation, with respect to said image-acquiring device, the first axis of rotation being orthogonal to said axis of sight of said image-acquiring device and wherein said subsystem is mounted so as to be rotatable with respect to said holder about a second axis of rotation, the second axis of rotation being parallel to said axis of sight of said image-acquiring device.

The image-acquiring system according to the invention makes it possible to acquire at least one image of an individual, for example an optionally high-resolution image of an entire face, or even in particular of the eyes, of the irises for example, if necessary while the individual is moving.

The reflective element is arranged to have a single axis of rotational freedom with respect to the image-acquiring device.

The arrangement of the reflective element with respect to the image-acquiring device allows the image-acquiring system to acquire at least one image during a vertical rotational movement about the first axis of rotation, referred to as "tilting", of the reflective element with respect to the image-acquiring device.

The arrangement of the subsystem with respect to the holder allows the image-acquiring system to acquire at least one image during a horizontal rotational movement about the second axis of rotation, referred to as "panning", of the subsystem with respect to the holder.

The two, vertical and horizontal, rotational movements may be combined to obtain a capture field that is cone-with-a-rectangular-base shape.

In other words, the overall arrangement of the image-acquiring system makes it possible to guarantee, in particular during a panning movement of the subsystem about the second axis of rotation, that the images reflected by the reflective element onto the image-acquiring device preserve the same angular orientation with respect to said axis of sight of the image-acquiring device.

Thus, compared with a prior-art image-acquiring system, the image-acquiring system according to an example of implementation of the invention has a relatively small footprint in the plane of the holder, and in particular in the system's depth direction, while achieving a field of image capture that is relatively larger panning-wise.

For example, the reflective element is configured to have a range of travel about the first axis of rotation of 70°.

In other words, the reflective element is configured to have, in particular, a travel of plus or minus 35° with respect to a nominal centre position at 45° to a nominal plane including the first axis and being orthogonal to the axis of sight of the image-acquiring device.

For example, the subsystem is configured to have a range of travel about the second axis of rotation of 40°.

In one embodiment, the second axis of rotation coincides with the axis of sight of the image-acquiring device, this being advantageous in respect of control.

In one embodiment, said image-acquiring device comprises at least one first image-acquiring unit, said at least one first image-acquiring unit comprising a sensor and an objective, the objective focusing the at least one image onto the sensor, the objective defining an optical axis of the first image-acquiring unit.

For example, said optical axis of said at least one first image-acquiring unit is parallel to said axis of sight of said image-acquiring device.

For example, said optical axis of said at least one first image-acquiring unit diverges from said axis of sight of said image-acquiring device by an angle of deviation of predetermined value.

In one embodiment, said image-acquiring device comprises at least one second image-acquiring unit, said second image-acquiring unit comprising a sensor and an objective, the objective of the second image-acquiring unit focusing the at least one image onto the sensor of the second image-acquiring unit, the objective of the second image-acquiring unit defining an optical axis of the second image-acquiring unit.

These two image-acquiring units make it possible to cover a wider field and in particular to acquire both eyes of a person at the same time, making it easier to distinguish between the left eye and right eye.

In one embodiment, the optical axis of at least the first image-acquiring unit or the second image-acquiring unit diverges with respect to said axis of sight of said image-acquiring device by an angle of deviation of a predetermined value.

In other words, at least the first or second image-acquiring unit is arranged so as to be inclined, and in particular to diverge, with respect to the axis of sight of the image-acquiring device.

This arrangement forms an angle of deviation between the optical axis of the first or second image-acquiring unit and the axis of sight of the image-acquiring device.

In one embodiment, the first image-acquiring unit and the second image-acquiring unit are arranged to diverge, with respect to the axis of sight of the image-acquiring device.

The angle of deviation between the optical axis of the first image-acquiring unit and the axis of sight of the image-acquiring device may be equal to the angle of deviation between the optical axis of the second image-acquiring unit and the axis of sight of the image-acquiring device.

The arrangement of the second image-acquiring unit is thus symmetrical to the arrangement of the first image-acquiring unit with respect to the axis of sight.

This angle of deviation thus makes it possible to make the optical axis of the at least one first and second image-acquiring units diverge with respect to the axis of sight of the image-acquiring device.

This angle of deviation in particular makes it possible to make the optical axis of the at least one first and second image-acquiring units diverge from one another.

Such a divergence of the optical axes thus makes it possible to increase the capture field of said image-acquiring device, while preserving an overlap of the capture fields of said at least one first and second image-acquiring units.

For example, the value of the angle of deviation is chosen so that a capture field of said image-acquiring device allows both eyes of an individual to be captured at the same time, including at a minimum operating distance of the image-acquiring system, which for example is 50 cm, or even less.

Specifically, the closer an individual is to the image-acquiring system, the more difficult it may be to acquire an image of both eyes simultaneously. The closer an individual is to the image-acquiring system, the wider a field of view of the image-acquiring system must be.

The divergent arrangement of at least two image-acquiring units thus makes it possible to widen this field.

For example, the value of the angle of deviation is chosen to obtain an overlap of the capture fields of the image-acquiring units, avoiding the presence of a blind spot in the image reconstructed from the at least one image delivered by the at least one first and second image-acquiring units.

For example, the value of the angle of deviation between the optical axis of the first or second image-acquiring unit and the axis of sight is comprised between 1.4° and 1.5°, and for example between 1.45° and 1.5°.

For example, the sensors of the at least one first and second image-acquiring units are positioned as close as possible to the axis of sight of the image-acquiring device, but not so close that the objectives of the at least one first and second image-acquiring units must touch.

For example, a distance between a centre of the sensor of the at least one first image-acquiring unit and the centre of the second image-acquiring unit depends on the optical formula of the objectives of the at least one first and at least one second image-acquiring units.

For example, this distance is comprised between 20 mm and 25 mm, and for example is in the region of 23 mm.

In one embodiment, said image-acquiring device comprises at least one second image-acquiring unit, said second image-acquiring unit comprising a sensor and an objective, the objective of the second image-acquiring unit focusing the at least one image onto the sensor of the second image-acquiring unit, the objective of the second image-acquiring unit defining an optical axis of the second image-acquiring unit, and wherein the optical axis of said first image-acquiring unit and the optical axis of said second image-acquiring unit diverge with respect to said axis of sight of said image-acquiring device by an angle of deviation of a predetermined value.

In one embodiment, said image-acquiring device comprises a bent holder comprising at least two flaps, a first of the two flaps bearing the sensor of the first image-acquiring unit and a second of the two flaps bearing the sensor of the second image-acquiring unit, said at least two flaps being connected to each other by at least one hinge zone, said hinge zone being configured so that said two flaps make a bending angle to each other.

The at least one hinge zone of the bent holder allows the bent holder to adopt a bending angle of predetermined value so as to incline the at least two flaps of the bent holder to each other.

Thus, the at least one hinge zone makes it possible to achieve the divergence of the optical axes of the at least one first and second image-acquiring units by applying a bending angle between the flaps which bear the sensors of said at least one first and second image-acquiring units.

For example, the bent holder is a printed circuit board (PCB).

For example, the at least one hinge zone of the bent holder is flexible, or bendable.

For example, the at least two flaps of the bent holder are rigid.

For example, the at least one hinge zone of the bent holder has a thickness that is smaller than the thickness of the at least two flaps.

In one embodiment, said image-acquiring device comprises a translating device configured to translate at least said objective of said at least one first image-acquiring unit with respect to said sensor of said at least one first image-acquiring unit along said axis of sight of said image-acquiring device.

The translating device allows the optical distance of the at least one first image-acquiring unit to be adjusted.

In other words, the translating device allows the distance between the sensor and the objective of the at least one first image-acquiring unit to be adjusted via a simple translational movement parallel to the axis of sight of the image-acquiring device.

In one embodiment, the translating device comprises a slide configured to bear said objective of the at least one first image-acquiring unit.

In one embodiment, said translating device comprises a stepper motor and a worm gear, said motor being configured to rotate said worm gear, and said worm gear being configured to make said slide translate along the axis of sight of said image-acquiring device.

In one embodiment, said translating device is further configured to translate said objective of said at least one second image-acquiring unit with respect to said sensor of said at least one second image-acquiring unit along said axis of sight of said image-acquiring device.

The image-acquiring device thus allows the optical distance of the at least one first and second image-acquiring units, i.e. the distance between the sensor and the objective of each image-acquiring unit, to be adjusted via a single translational movement of the objectives of the at least one first and second image-acquiring units.

In one embodiment, said slide is further configured to bear the objectives of the at least one first and second image-acquiring units, this particularly allowing them to be translated together.

In one embodiment, said image-acquiring system comprises a reflective-element motor configured to pivot said reflective element with respect to said image-acquiring device about said first axis of rotation.

For example, the reflective-element motor is a direct drive motor.

Direct drive motors are configured so that the load driven by a motor is directly secured to the rotor of the motor.

Such a motor makes it possible to avoid introducing play between the shaft rotated by the motor and the load driven by the motor.

Such a motor allows a more precise rotational movement.

Such a motor allows noise to be decreased.

Such a motor allows wear of the motor to be decreased, leading to an improvement in its lifespan.

For example, the reflective-element motor is a brushless direct drive motor.

Such a motor allows wear to be decreased, and very fluid control able to meet the need to track the eyes of a moving person to be obtained.

In one embodiment, said image-acquiring system comprises a subsystem motor configured to pivot said subsystem with respect to said holder about said second axis of rotation.

For example, the subsystem motor is a direct drive motor.

For example, the subsystem motor is a brushless direct drive motor.

For example, as a variant, the horizontal rotational movement about the axis of rotation D3, referred to as "panning", of the subsystem with respect to the holder is achieved manually by an operator of the image-acquiring system.

In one embodiment, said image-acquiring system comprises a reflective-element motor configured to pivot said reflective element about said first axis of rotation and a subsystem motor configured to pivot said subsystem about said second axis of rotation.

In one embodiment, the holder comprises an electrical interface and the subsystem comprises an electrical interface, and the image-acquiring system comprises a flexible connecting element configured to electrically connect the electrical interface of said holder to the electrical interface of said subsystem, said flexible connecting element being arranged around said second axis of rotation.

The flexible connecting element allows the electrical interfaces of the holder and of the subsystem to be connected while accompanying the horizontal rotational movement of the subsystem, with respect to the holder, with a flexion of the connecting element around the second axis of rotation.

In other words, the flexible connecting element winds and unwinds around the second axis of rotation, or in particular around the subsystem motor.

The flexion of the flexible connecting element around a single axis thus allows its lifespan to be increased, limiting, or even avoiding, flexions about two different axes, and/or torsion.

One advantage of such an image-acquiring system comprising such a connecting element is that only one cable need move.

For example, the flexible connecting element is arranged around the subsystem motor.

For example, said flexible connecting element allows transmission of various signals, such as electrical power, video signals, or even motor-control signals.

For example, the flexible connecting element is a cable or wire.

For example, the electrical interface of the holder allows communication with a control unit.

For example, the electrical interface of the subsystem allows communication with the image-acquiring device, the reflective-element motor, the subsystem motor and in particular the stepper motor.

In one embodiment, said image-acquiring system comprises an elastic guiding element arranged around said flexible connecting element, said elastic guiding element having a first end joined to said holder and a second end joined to said subsystem, the elastic guiding element being configured to be elastically deformed during a rotation of the subsystem about the second axis of rotation with respect to the holder.

Said elastic guiding element makes it possible to ensure that the flexible connecting element will remain in place independently of the gravitational force acting on said flexible connecting element.

Support of the flexible connecting element by the elastic guiding element makes it possible to prevent the flexible connecting element from sagging.

Support of the flexible connecting element by the elastic guiding element makes it possible to avoid contact of the flexible connecting element with other parts of the image-acquiring system, such contact particularly generating friction with the flexible connecting element.

The elastic guiding element allows the flexion of the flexible connecting element to be controlled.

The elastic guiding element allows the stresses generated during the flexing movement of said flexible connecting element to be exerted foremost on said elastic guiding element, rather than on the flexible connecting element.

Under the effect of the stresses generated by the rotational movement of the subsystem around the second axis of rotation, the elastic guiding element deforms elastically.

Thus, such an elastic guiding element allows the lifespan of said connecting element to be increased.

For example, the guiding element is fastened by its ends to the holder and subsystem by straps, or brackets.

In one embodiment, the elastic guiding element is a spring.

Use of a spring with a determined number of turns as an elastic guiding element allows a number of contact points with the flexible connecting element to be set through the number of turns of the spring.

A high number of contact points between the elastic guiding element and the flexible connecting element allows stresses to be better distributed over the entirety of the flexible connecting element.

For example, to define the number of turns of the spring, a nominal distance between two consecutive turns of the spring is set approximately equal to a diameter of the flexible connecting element.

In one embodiment, the sensor of the at least one first image-acquiring unit and/or of the at least one second image-acquiring unit is a sensor employing a global shutter.

A sensor employing a global shutter need be illuminated only during an exposure time.

A sensor employing a global shutter may be more brightly illuminated and for a shorter overall time than a sensor employing a rolling shutter.

A sensor employing a global shutter allows the motion blur of the image-acquiring device to be decreased compared with a sensor employing a rolling shutter.

A sensor employing a global shutter makes it possible to guarantee a sufficient signal level and limited noise compared with a sensor employing a rolling shutter.

A sensor employing a global shutter allows the at least one image-acquiring unit to be made less sensitive to infrared wavelengths potentially present in the luminous environment of said image-acquiring system, compared with a sensor employing a rolling shutter.

In one embodiment, said image-acquiring system comprises at least one context-image-acquiring device configured to acquire at least one context image, said at least one context-image-acquiring device being fastened to said holder.

The expression "context image" here designates an image providing an overview of a capture field, and allowing a detail, in the present case for example a face or even the eyes of an individual, to be chosen and located more precisely. The at least one image-acquiring device of the system according to the invention is then configured to point at this detail.

In one particular example, providing two context-image-acquiring devices allows the eyes to be located in three dimensions.

Acquisition of a context image, in particular of an individual, by the at least one context-image-acquiring device allows the three-dimensional aiming accuracy of the image-acquiring device of the subsystem to be increased.

In other words, the at least one context-image-acquiring device makes it possible to improve tracking of the individual by said subsystem if the individual is moving.

For example, the at least one context-image-acquiring device is attached to the holder of the image-acquiring system by way of a vertical frame that frames the image-acquiring system.

In one embodiment, said image-acquiring system comprises two context-image-acquiring devices.

For example, a first of the two context-image-acquiring devices is positioned above the subsystem.

For example, a second of the two context-image-acquiring devices is positioned below the subsystem.

For example, said two context-image-acquiring devices are centred on said axis of sight of said image-acquiring device, i.e. placed along said axis of sight.

Such an arrangement of the two context-image-acquiring devices makes it possible to improve the accuracy of the subsystem and to improve the centrality of the image reflected by the reflective element onto the image-acquiring device.

The invention will be well understood and its advantages will become more clearly apparent on reading the following detailed description, which is given by way of completely non-limiting indication, with reference to the appended drawings, in which:

FIG. 1 shows an image-acquiring system according to one example of embodiment of the invention;

FIG. 2, which includes FIGS. 2a, 2b and 2c, shows in more detail an arrangement of two image-acquiring units of the image-acquiring system of FIG. 1;

Identical elements shown in the aforementioned figures have been identified by identical reference numbers.

FIG. 1 shows an image-acquiring system 20 according to one example of embodiment of the invention.

In the described example, the image-acquiring system 20 comprises a holder 21.

The holder 21 comprises a first wall 22 defining a planar mounting surface.

The holder 21 comprises a second wall 23 orthogonal to the first wall 22.

The second wall 23 here facilitates installation of the system into a control unit.

Figure 1:
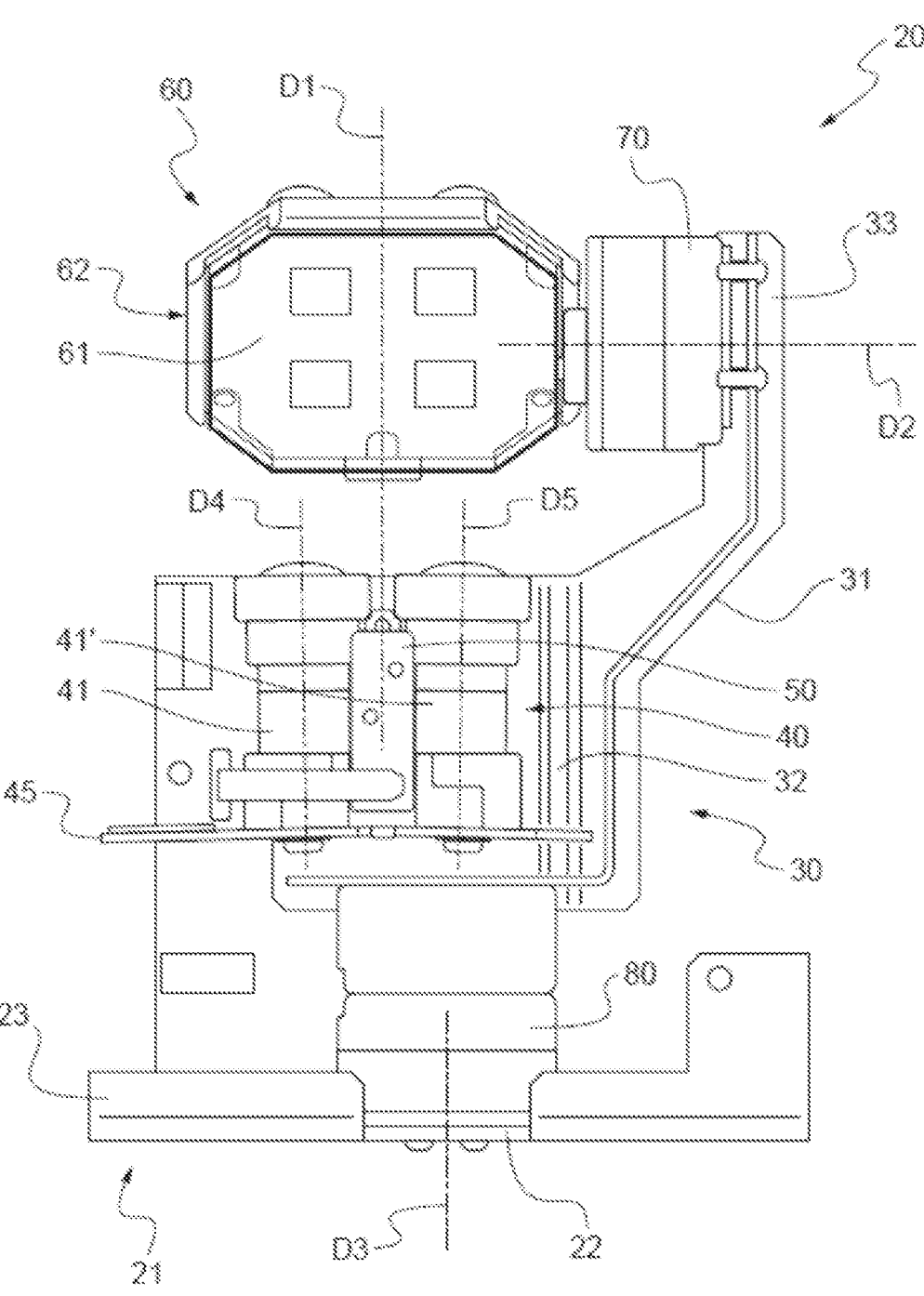

The second wall 23 here comprises a frame 105 (not shown in FIG. 1).

In the described example, the image-acquiring system 20 comprises a subsystem 30.

The subsystem 30 is rotatable about an axis of rotation D3 with respect to the holder 21.

In the described example, the subsystem 30 comprises an image-acquiring device 40.

The image-acquiring device 40 is configured to acquire at least one image along an axis of sight D1.

In the described example, the axis of rotation D3 is parallel to the axis of sight D1 of said image-acquiring device 40.

The image-acquiring device 40 here comprises a first image-acquiring unit 41.

The first image-acquiring unit 41 comprises an objective 42 and a sensor 43 (not shown in FIG. 1).

The objective 42 of the at least one image-acquiring unit 41 focuses the at least one image onto the sensor 43 of the at least one image-acquiring unit 41, and thus defines an optical axis D4.

In the present case, the image-acquiring device 40 further comprises a second image-acquiring unit 41'.

The second image-acquiring unit 41' is here identical to the first acquiring unit 41.

However, it could be different.

Thus, an objective of the second image-acquiring unit 41' here defines an optical axis D5.

In the present case, each optical axis D4, D5, of the first and second image-acquiring units 41, 41', respectively, diverges with respect to the axis of sight D1 of said image-acquiring device 40 by an angle of deviation of a predetermined value.

In other words, a distance of separation, between each optical axis D4, D5 and the axis of sight D1, here increases with a distance with respect to the respective objective of the at least one first and at least one second image-acquiring units 41, 41'.

In the present case, the at least one first and at least one second image-acquiring units here have characteristics such that, in the far field, i.e. at at least 1.2 m, the resolution is sufficient for an iris of an individual to be recognized, i.e. for an iris of 10.2 mm diameter to be imaged by 160 pixels.

In the present case, the at least one first and at least one second image-acquiring units here have characteristics such that, in the near field, i.e. at about 0.5 m at most, the lateral field of the two cameras combined is sufficient to capture both eyes of an individual, with a margin allowing for misaiming.

The objectives of the at least one first and at least one second image-acquiring units are here chosen to have a focal length comprised between 40 mm and 60 mm, and for example in the region of 50 mm.

In the described example, the subsystem 30 comprises a reflective element 60.

The reflective element 60 is arranged transversely to said axis of sight D1.

The reflective element 60 is configured to reflect an image onto the image-acquiring device 40.

In the present case, the reflective element 60 here reflects an image onto the first and second image-acquiring units 41, 41' of the image-acquiring device 40.

The reflective element 60 is mounted so as to be rotatable with respect to said image-acquiring device 40, about an axis of rotation D2.

The axis of rotation D2 is orthogonal to the axis of sight D1 of the image-acquiring device 40.

In the present case, the reflective element 60 is here of hexagonal geometric shape, but it could be of any other geometric shape.

The reflective element 60 here comprises a reflective surface 61 that is configured to reflect an image.

The reflective element 60 further comprises a casing 62 configured to hold the reflective surface 61 of the reflective element 60, and by means of which the pivoting action of the reflective element 60 is actuated.

In the described example, the subsystem 30 comprises a reflective-element motor 70, also called the "tilting" motor.

The reflective-element motor 70 is configured to pivot said reflective element 60 with respect to the image-acquiring device 40 about the axis of rotation D2.

The reflective-element motor 70 for example comprises a portion referred to as the "fixed" portion, attached to a scaffold 31 that is described below, and a portion referred to as the "mobile" portion, configured to pivot with respect to the fixed portion, and to which the reflective element 60 is attached.

In the present case, the reflective-element motor 70 is here a direct drive motor that is preferably brushless, this also decreasing wear and allowing very fluid control able to meet the need to track the eyes of a moving person.

In the described example, the image-acquiring system 20 comprises a subsystem motor 80.

The subsystem motor 80 is configured to pivot the subsystem 30 with respect to the holder 21 about the axis of rotation D3.

The subsystem motor 80, also called the "panning motor", for example comprises a portion referred to as the "fixed" portion, attached to the subsystem 30, and a portion referred to as the "mobile" portion, configured to pivot with respect to the fixed portion, and to which the holder 21, and in particular here the first wall 22, is attached.

However, as a variant, the fixed portion could be attached to the holder 21 and the mobile portion could be attached to the subsystem 30.

In the present case, the subsystem motor 80 is here a direct drive motor that is preferably brushless, this also decreasing wear and allowing very fluid control able to meet the need to track the eyes of a moving person.

In the described example, the subsystem 30 comprises the scaffold 31.

In the present example, the image-acquiring device 40, the reflective-element motor 70 and the subsystem motor 80 are arranged on the scaffold 31.

The subsystem 30 is here attached to the mounting surface of the first wall 22 of the holder 21 by way of the subsystem motor 80, and the reflective element 60 is attached to the scaffold 31 of the subsystem 30 by way of the reflective-element motor 70.

The scaffold 31 is here attached to the subsystem motor 80, and more particularly to the fixed portion of the subsystem motor 80.

The scaffold 31 of the subsystem 30 here comprises a main body 32 and an arm 33.

The main body 32 is here configured to hold the image-acquiring device 40.

The main body 32 here has a rectangular profile.

The arm 33 here extends from the main body 32.

The arm 33 is here configured to hold the reflective-element motor 70, and more particularly the fixed portion of the reflective-element motor 70.

In the present case, the arm 33 here comprises a first portion extending from the main body 32 at an angle of 45° to the axis of sight D1 of the image-acquiring device 40 and comprises a second portion extending the first portion parallel to the axis of sight D1 of the image-acquiring device 40.

The arrangement of the arm 33 thus allows the reflective element 60 to be centred with respect to the axis of sight D1 of the image-acquiring device 40.

Figures 2A, 2B, 2C:
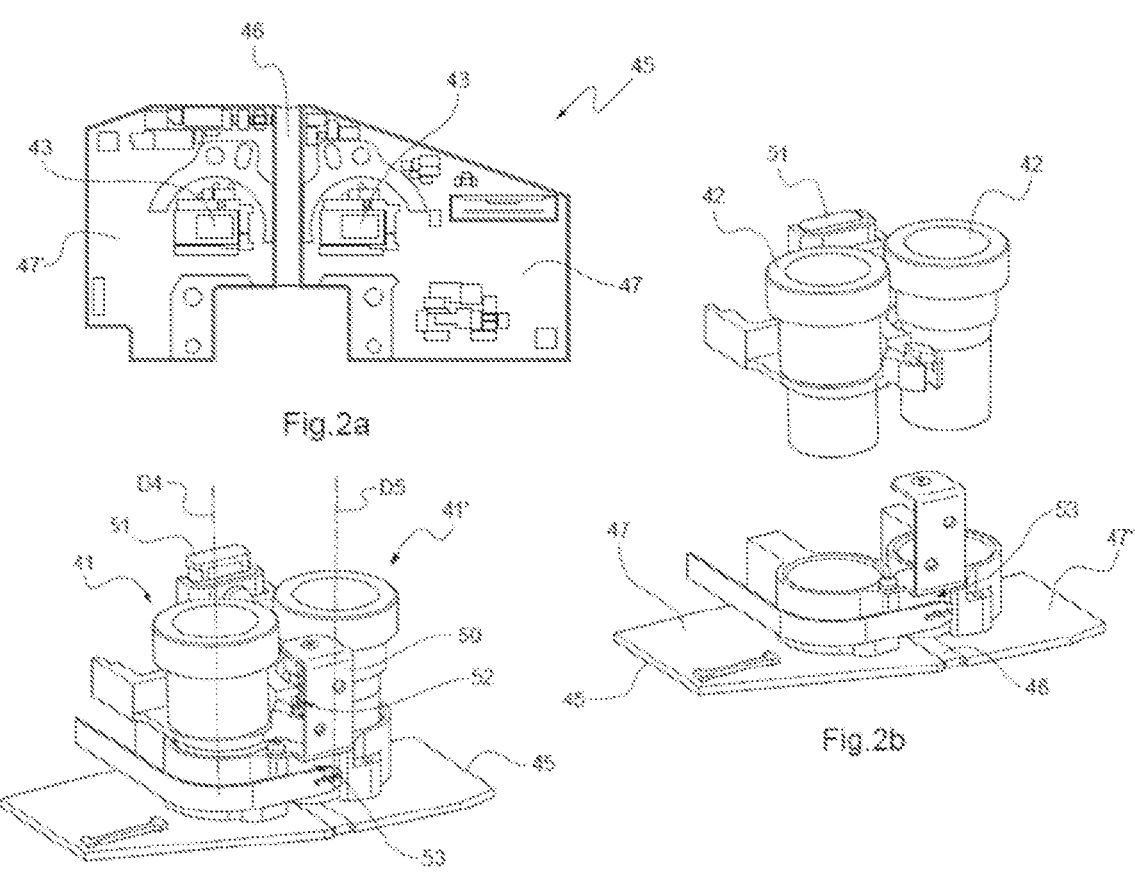
Figure 3:
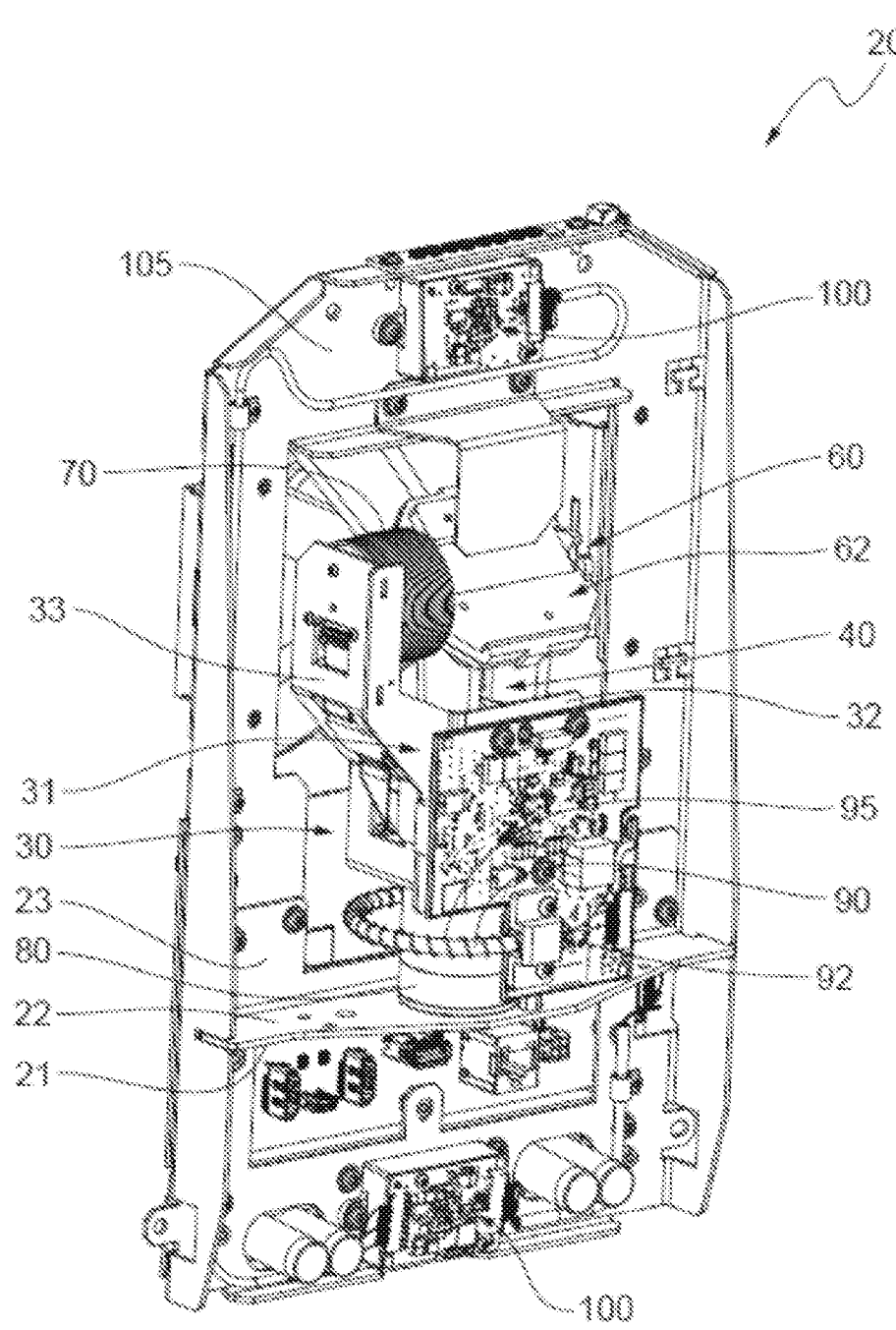
FIG. 3 shows a rear view of an image-acquiring system according to a second example of embodiment of the invention.

FIGS. 2a, 2b and 2c show in greater detail the arrangement of the two image-acquiring units 41, 41' of the image-acquiring system 20 of FIG. 1.

In the described example, the image-acquiring device 40 comprises a bent holder 45.

The bent holder 45 comprises at least two flaps 47,47'.

The at least two flaps 47,47' each bear one sensor 43 of the at least one first and at least one second image-acquiring units 41, 41'.

The at least two flaps 47,47' are connected by at least one hinge zone 46.

The hinge zone 46 is configured so that the at least two flaps 47, 47' make a bending angle to each other.

In the present case, the hinge zone 46 is here configured to be bowed, or to be curved, or to be bent, so that the at least two flaps make to each other a bending angle of determined value.

This bending angle here makes it possible to achieve a different orientation of the two sensors 43, and in particular here makes it possible to make the optical axes D4, D5 of the at least one first and at least one second image-acquiring units 41, 41' diverge.

In the present case, the bent holder 45 is here a printed circuit board or PCB, at least one hinge zone 46 of which here has a thickness smaller than the thickness of the at least two flaps 47, 47'.

In the described example, the subsystem 30 comprises a translating device 50.

The translating device 50 is configured to translate at least the objective 42 of the at least one first image-acquiring unit 41 with respect to the sensor 43 of the at least one first image-acquiring unit 41 along the axis of sight D1 of the image-acquiring device 40, this allowing focus to be adjusted.

In the present case, the translating device 50 is here configured to simultaneously translate the objective of each of the first and second image-acquiring units 41, 41' via a single translational movement, parallel to the axis of sight D1.

In other words, the objectives of each of the first and second image-acquiring units 41, 41' may be translated together, this allowing an identical focal plane to obtained for the two image-acquiring units 41, 41' at a given time.

In the present example of embodiment, the translating device 50 comprises a slide 51, a worm gear 52 and a stepper motor 53.

The slide 51 is configured to bear the objective 42 of the first and second image-acquiring units 41, 41'.

The worm gear 52 is configured to translate said slide 51 along the axis of sight D1 of said image-acquiring device 40.

The stepper motor 53 is configured to make said worm gear 52 rotate.

The slide 51 further comprises a nut (not shown).

The nut is engaged with the worm gear 52.

The nut is configured to be blocked rotationally by the slide 51 so that the worm gear 52 causes the nut, and therefore the slide 52, to translate along the axis of sight D1.

The translating device 50 thus allows a movement resolution consistent with a depth of field of the objectives 42.

A back focus (objective/sensor distance) of the image-acquiring device 40 may thus be adjusted very precisely by virtue of the translating device 50.

FIGS. 3 to 6 show an image-acquiring system 20 according to another example of embodiment of the invention, comprising the features of the example of embodiment illustrated in FIGS. 1 and 2, and additional features that are described below.

In this example, the holder 21 further comprises an electrical interface (not shown).

The electrical interface of the holder 21 is configured to communicate with a control unit external to the image-acquiring system 20.

In this example, the subsystem 30 comprises an electrical interface 92.

The electrical interface 92 of the subsystem 30 is configured to ensure communication and to distribute electrical power between the electrical interface of the holder 21 and the image-acquiring device 40, the reflective-element motor 70, the subsystem motor 80 and the stepper motor 53.

In the described example, the image-acquiring system 20 comprises a flexible connecting element 90.

The flexible connecting element 90 is configured to electrically connect the electrical interface of the holder 21 to the electrical interface 92 of the subsystem 30.

The flexible connecting element 90 is arranged around the axis of rotation D3.

In the present case, the flexible connecting element 90 is here arranged around the subsystem motor 80.

The flexible connecting element 90 here allows transmission of various signals, and for example electrical power to be supplied.

The flexible connecting element 90 is here an electrical wire, in particular a micro-coaxial cable allowing impedance to be controlled, various signals to be transmitted over sufficiently long distances of the order of 20 cm to 50 cm and the radius of curvature of the electrical wire to decrease during movements, and in particular one using the MIPI CSI protocol.

In the present case, the electrical interface 92 of the subsystem 30 is here configured at least to control the reflective-element motor 70, the subsystem motor 80 and the stepper motor 53.

The electrical interface 92 of the subsystem 30 also here allows the supply of electrical power to the subsystem 30, and in particular to the reflective-element motor 70, to the subsystem motor 80 and to the stepper motor 53, to be centralized.

In the present case, the electrical interface of the holder 21 may here be likened to a main processing platform configured at least to process the at least one image delivered by the image-acquiring device 40.

In the described example, the image-acquiring system 20 comprises an elastic guiding element 95.

The elastic guiding element 95 is in particular configured to hold the flexible connecting element 90 in place.

The elastic guiding element 95 is here arranged around said flexible connecting element 90.

The elastic guiding element 95 comprises a first end joined to said holder 21 and a second end joined to said subsystem 30.

The elastic guiding element 95 is configured to be elastically deformed during a rotation of the subsystem 30 with respect to the holder 21 about the axis of rotation D3.

In the present case, the elastic guiding element 95 here comprises a spring.

In the described example, the image-acquiring system 20 comprises at least one context-image-acquiring device 100.

The at least one context-image-acquiring device 100 is configured to acquire at least one context image, i.e. an image having a larger capture field than the at least one image obtained by the image-acquiring device 40, so that the image-acquiring device 40 may subsequently be aimed accurately.

The at least one context-image-acquiring device 100 in particular here makes it possible to choose and accurately locate a face, or the eyes of an individual.

The at least one context-image-acquiring device 100 is fastened to said holder 21.

In the present case, the image-acquiring system 20 here comprises first and second context-image-acquiring devices 100.

The first and second context-image-acquiring devices 100 in particular here allow to the eyes of an individual to be located via stereoscopy.

The first and second context-image-acquiring devices 100 are in particular arranged to be sufficiently far apart from each other that the eyes of an individual may be located with sufficient accuracy in three dimensions.

The subsystem 30 is here placed between the first context-image-acquiring device 100 and the second context-image-acquiring device 100.

The first and second context-image-acquiring devices 100 are here centred on the axis of sight D1 of said image-acquiring device 40.

In the present case, the first and second context-image-acquiring devices 100 are attached to the holder 21 by way of the frame 105.

The frame 105 here completely frames the subsystem 30.

In other words, the first context-image-acquiring device 100 is located above the subsystem 30, while the second context-image-acquiring device 100 is located below the subsystem 30.

In the present case, the frame 105 here further comprises an indicator light configured to guide a gaze of an individual towards the first context-image-acquiring device 100.

This indicator light in particular here makes it possible to guarantee that the individual's gaze is centred in a photo of her or his face and that the individual's irises are oriented towards the image-acquiring device 40.

In the present case, the electrical interface of the holder 21 may here be likened to a main processing platform configured at least to process the at least one image delivered by the image-acquiring device 40, the at least one image delivered by the at least one context-image-acquiring device 100 and to manage the indicator light.

Figure 4:
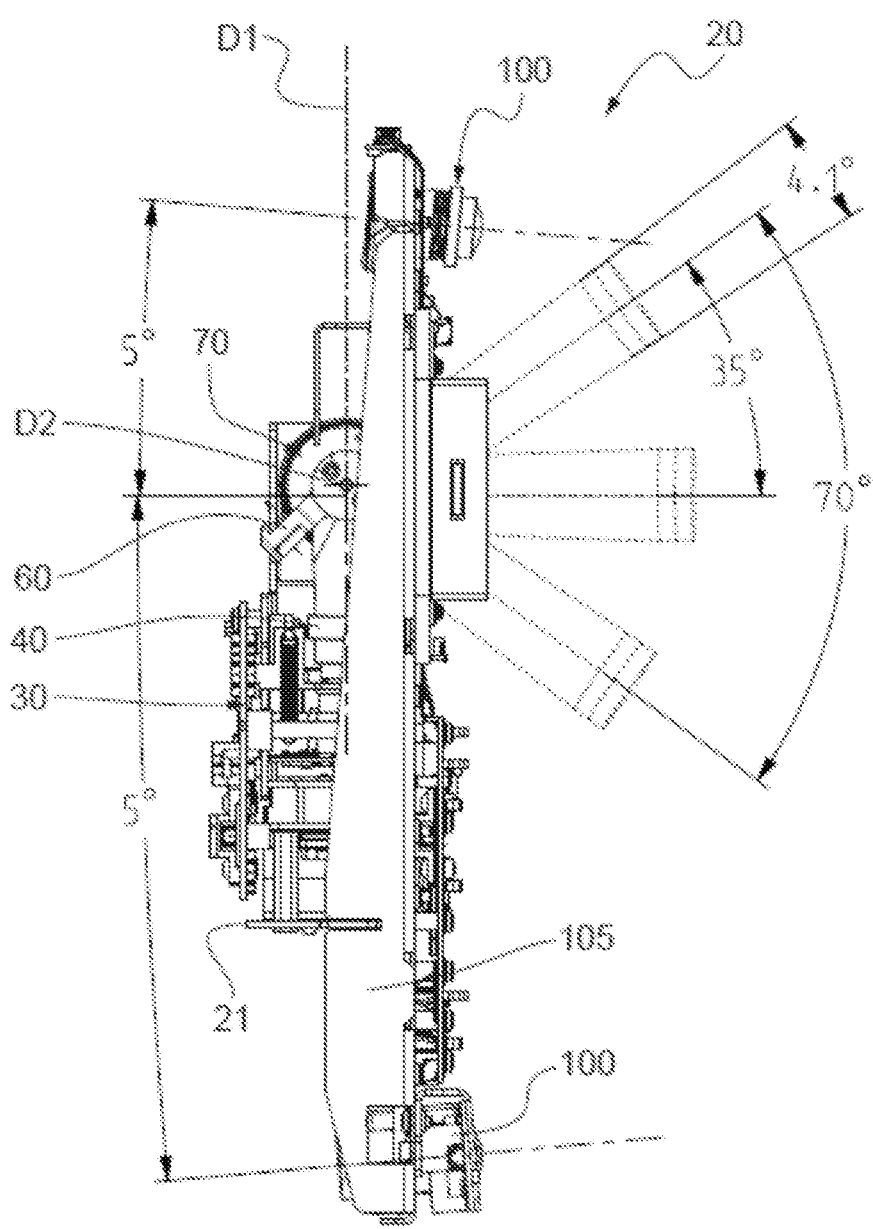
FIG. 4 shows a side view of the image-acquiring system of the example of embodiment of FIG. 3.

As illustrated in FIG. 4, the imaging device 40 has a vertical capture field that depends on the rotational movement of the reflective element 60 about the axis of rotation D2.

The reflective element 60 is here configured to have a range of travel of in the region of 70° about the axis of rotation D2, and in particular to have a travel of plus or minus 35° with respect to a nominal centre position at 45° to a nominal plane including the axis D2 and orthogonal to the axis of sight D1.

Figure 5:
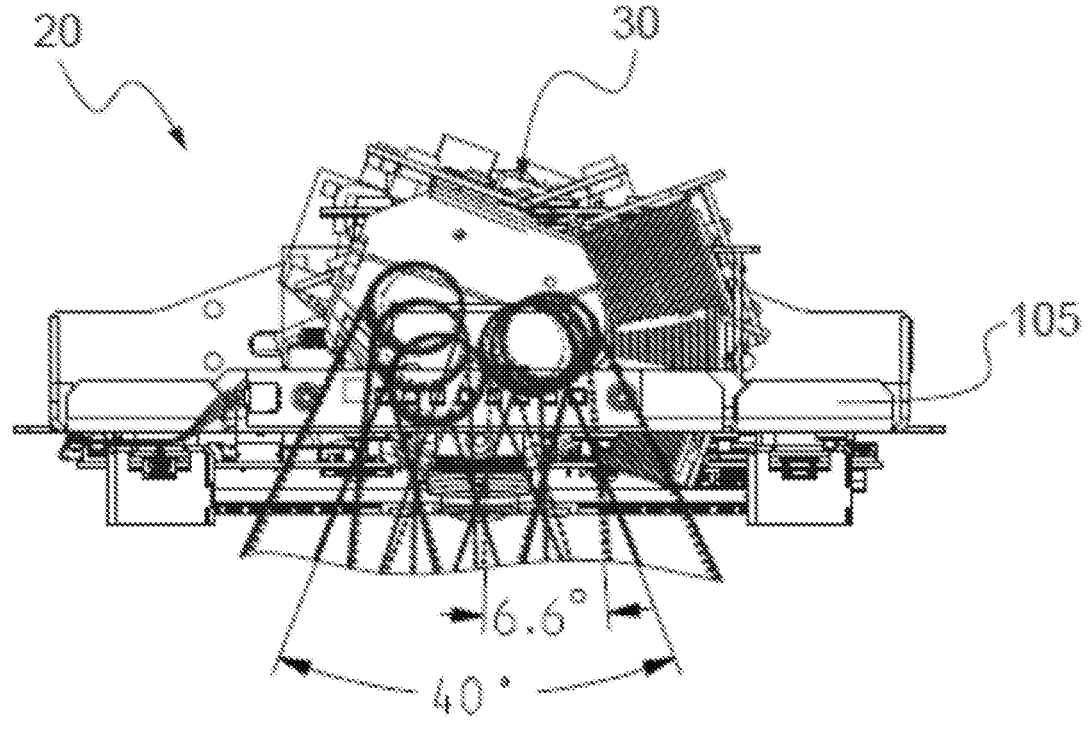
FIG. 5 shows a top view of the image-acquiring system of the example of embodiment of FIG. 3.

As illustrated in FIG. 5, the imaging device 40 has a horizontal capture field that depends on the rotational movement of the subsystem 30 about the axis of rotation D3.

The subsystem 30 is here configured to have a range of travel of in the region of 40° about the axis of rotation D3, and preferably a symmetrical travel with respect to this axis D3 of plus or minus 20°, with a view to scanning the scene horizontally.

Figure 6:
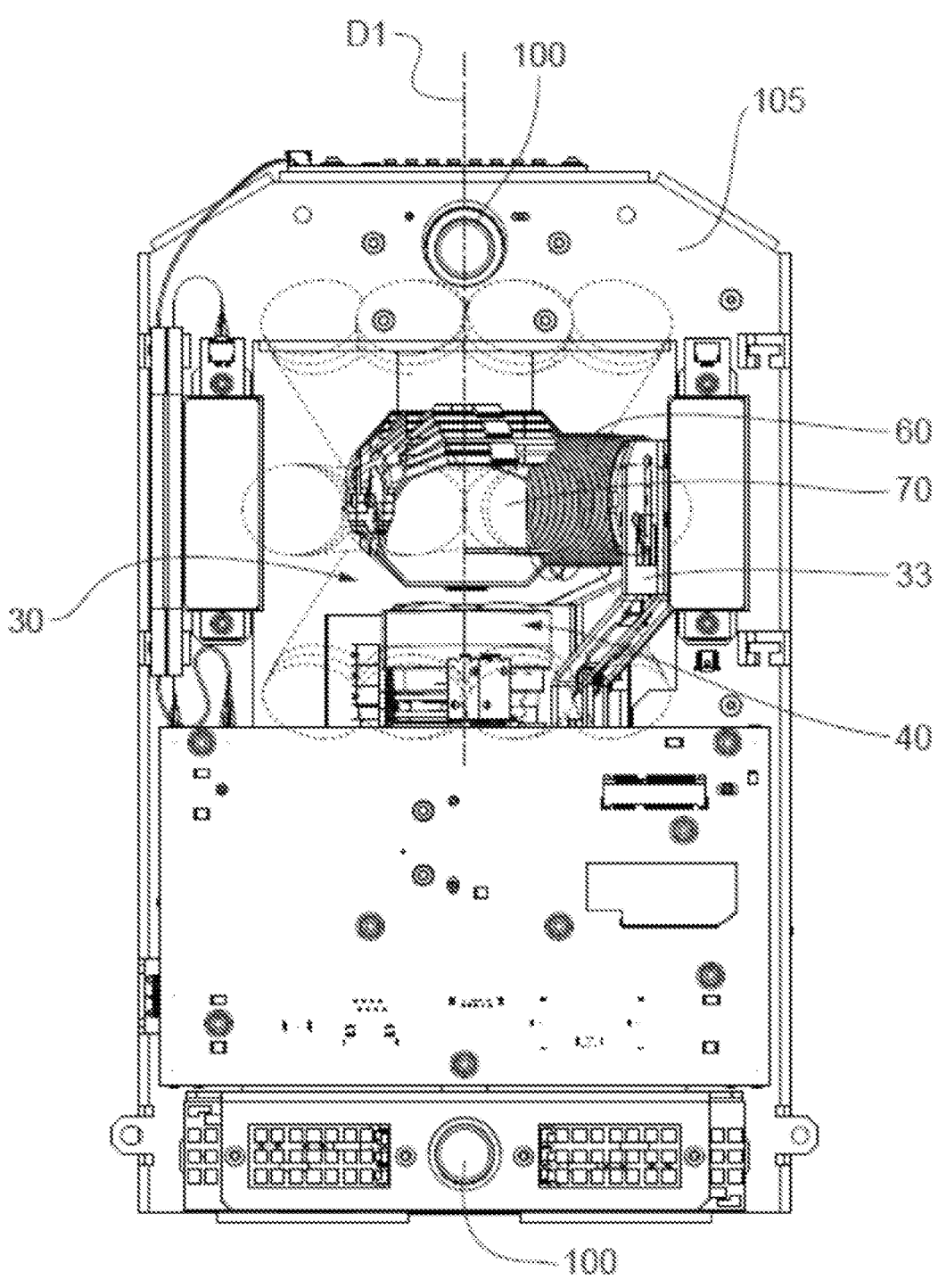
FIG. 6 shows a front view of the image-acquiring system of the example of embodiment of FIG. 3.

FIG. 6 illustrates the overall capture field of the image-acquiring system 20 obtained by combining the range of travel of the reflective element 60 about the axis of rotation D2 and the range of travel of the subsystem 30 about the axis of rotation D3.

The invention claimed is:

1. An image-acquiring system, comprising:
a holder and a subsystem mounted on the holder,
said subsystem including an image-acquiring device configured to acquire at least one image along an axis of sight, a reflective element arranged transversely to said axis of sight and configured to directly reflect the at least one image onto said image-acquiring device, said reflective element being mounted to be rotatable, about a first axis of rotation, with respect to said image-acquiring device, the first axis of rotation being orthogonal to said axis of sight of said image-acquiring device,
wherein said subsystem is mounted to be rotatable with respect to said holder about a second axis of rotation, the second axis of rotation being parallel to said axis of sight of said image-acquiring device.

2. The image-acquiring system according to claim 1, wherein said image-acquiring device further includes at least one first image-acquiring circuitry including a sensor and an objective, the objective focusing the at least one image onto the sensor, the objective defining an optical axis of the first image-acquiring circuitry.

3. The image-acquiring system according to claim 2, wherein said image-acquiring device further includes at least one second image-acquiring circuitry, said second image-acquiring circuitry including a sensor and an objective, the objective of the second image-acquiring circuitry focusing the at least one image onto the sensor of the second image-acquiring circuitry, the objective of the second image-acquiring circuitry defining an optical axis of the second image-acquiring circuitry, and wherein the optical axis of said first image-acquiring circuitry and the optical axis of said second image-acquiring circuitry diverge with respect to said axis of sight of said image-acquiring device by an angle of deviation of a predetermined value.

4. The image-acquiring system according to claim 3, wherein said image-acquiring device further includes a bent holder having at least two flaps, a first of the at least two flaps bearing the sensor of the first image-acquiring circuitry and a second of the two flaps bearing the sensor of the second image-acquiring circuitry, said at least two flaps being connected to each other by at least one hinge zone, said hinge zone being configured so that said two flaps make a bending angle to each other.

5. The image-acquiring system according to claim 4, wherein said image-acquiring device further includes a translating device configured to translate at least said objective of said at least one first image-acquiring circuitry with respect to said sensor of said at least one first image-acquiring circuitry along said axis of sight of said image-acquiring device.

6. The image-acquiring system according to claim 4, further comprising: a reflective-element motor configured to pivot said reflective element about said first axis of rotation and a subsystem motor configured to pivot said subsystem about said second axis of rotation.

7. The image-acquiring system according to claim 3, wherein said image-acquiring device further includes a translating device configured to translate at least said objective of said at least one first image-acquiring circuitry with respect to said sensor of said at least one first image-acquiring circuitry along said axis of sight of said image-acquiring device.

8. The image-acquiring system according to claim 3, further comprising: a reflective-element motor configured to pivot said reflective element about said first axis of rotation and a subsystem motor configured to pivot said subsystem about said second axis of rotation.

9. The image-acquiring system according to claim 3, wherein the holder further comprises an electrical interface and the subsystem having an electrical interface, and the image-acquiring system further comprises a flexible connecting element configured to electrically connect the electrical interface of said holder to the electrical interface of said subsystem, said flexible connecting element being arranged around said second axis of rotation.

10. The image-acquiring system according to claim 3, wherein the holder further comprises an electrical interface and the subsystem having an electrical interface, and the image-acquiring system further comprises a flexible connecting element configured to electrically connect the electrical interface of said holder to the electrical interface of said subsystem, said flexible connecting element being arranged around said second axis of rotation.

11. The image-acquiring system according to claim 2, wherein said image-acquiring device further includes a translating device configured to translate at least said objective of said at least one first image-acquiring circuitry with respect to said sensor of said at least one first image-acquiring circuitry along said axis of sight of said image-acquiring device.

12. The image-acquiring system according to claim 11, further comprising: a reflective-element motor configured to pivot said reflective element about said first axis of rotation and a subsystem motor configured to pivot said subsystem about said second axis of rotation.

13. The image-acquiring system according to claim 11, wherein said translating device is further configured to translate said objective of at least one second image-acquiring circuitry with respect to said sensor of said at least one second image-acquiring circuitry along said axis of sight of said image-acquiring device, and wherein the system further comprises:

a reflective-element motor configured to pivot said reflective element about said first axis of rotation and a subsystem motor configured to pivot said subsystem about said second axis of rotation.

14. The image-acquiring system according to claim 2, further comprising: a reflective-element motor configured to pivot said reflective element about said first axis of rotation and a subsystem motor configured to pivot said subsystem about said second axis of rotation.

15. The image-acquiring system according to claim 2, wherein the holder further comprises an electrical interface and the subsystem having an electrical interface, and the image-acquiring system further comprises a flexible connecting element configured to electrically connect the electrical interface of said holder to the electrical interface of said subsystem, said flexible connecting element being arranged around said second axis of rotation.

16. The image-acquiring system according to claim 1, further comprising: a reflective-element motor configured to pivot said reflective element about said first axis of rotation and a subsystem motor configured to pivot said subsystem about said second axis of rotation.

17. The image-acquiring system according to claim 1, wherein the holder further comprises an electrical interface and the subsystem having an electrical interface, and the image-acquiring system further comprises a flexible connecting element configured to electrically connect the electrical interface of said holder to the electrical interface of said subsystem, said flexible connecting element being arranged around said second axis of rotation.

18. The image-acquiring system according to claim 17, further comprising an elastic guiding element arranged around said flexible connecting element, said elastic guiding element having a first end joined to said holder and a second end joined to said subsystem, the elastic guiding element being configured to be elastically deformed during a rotation of the subsystem about the second axis of rotation with respect to the holder.

19. The image-acquiring system according to claim 1, further comprising at least one context-image-acquiring device configured to acquire at least one context image, said at least one context-image-acquiring device being fastened to said holder.

20. The image-acquiring system according to claim 1, wherein said reflective element is mounted to be rotatable only about a first axis of rotation with respect to the holder.

* * * * *